United States Patent Office 3,180,857
Patented Apr. 27, 1965

3,180,857
BLEND OF VINYLIDENE CYANIDE-UNSATURATED SULFONIC ACID COPOLYMER AND N,N-DIMETHYLACRYLAMIDE POLYMER
Anthony B. Conciatori, Chatham, and Charles L. Smart, Millington, N.J., assignors to Celanese Corporation of America, New York, N.Y., a corporation of Delaware
No Drawing. Filed Feb. 14, 1961, Ser. No. 89,122
12 Claims. (Cl. 260—883)

The present invention relates to rendering dyeable with cationic dyes synthetic resinous copolymers of vinylidene cyanide.

Resinous copolymers generally containing in excess of about 45% of vinylidene cyanide (methylene malononitrile or vinylidene dinitrile) units copolymerized with one or more ethylenically unsaturated monomers such as vinyl acetate or the like are described in United States Patents No. 2,615,865 through 2,615,880 inclusive, 2,628,-954, 2,650,911, 2,654,724, 2,654,728, 2,657,197, 2,716,-104, 2,716,105, 2,716,106 and 2,740,769 and Canadian Patent No. 569,262.

The copolymers usually comprise units of vinylidene cyanide alternated with one or more copolymerizable monomers selected from the following classes of compounds:

(1) Vinyl esters of aliphatic monocarboxylic acids, preferably of the structure RCOOH, wherein R is alkyl, such as vinyl acetate, vinyl propionate, vinyl butyrate, vinyl isobutyrate, vinyl valerate, vinyl caproate, vinyl enanthate and the like. The copolymerization with vinylidene cyanide of such copolymerizable monomers and the resulting copolymers are described more fully in U.S. Patent 2,615,866, issued October 28, 1952.

(2) Vinyl esters of the structure

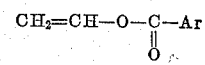

wherein Ar is an aromatic radical in which all the hydrogen atoms are attached to carbon atoms, such as vinyl benzoate; homologs of vinyl benzoate of the formula

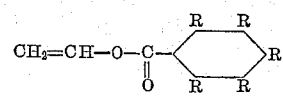

wherein each R is a member of the class consisting of hydrogen atoms or lower alkyl radicals, for example, vinyl toluate and the like; monomers of the above general class wherein the aromatic radical is halogen substituted, such as vinyl p-chlorobenzoate, vinyl o-chlorobenzoate, vinyl m-chlorobenzoate, and similar vinyl halobenzoates, and monomers of the above general class wherein the aromatic radical is alkoxy substituted, for example, vinyl p-methoxybenzoate, vinyl o-methoxybenzoate and vinyl p-ethoxybenzoate. The copolymerization with vinylidene cyanide, of such monomers, and the resulting copolymers are disclosed in U.S. Patent 2,615,-867, issued October 28, 1952;

(3) Styrene and substituted styrenes of the general formula

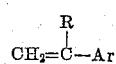

wherein Ar is an aromatic radical in which all of the hydrogen atoms are attached to carbon atoms and R is a member of the class consisting of hydrogen atoms and alkyl radicals, preferably those which contain from 1 to 4 carbon atoms, such as styrene itself, and substituted styrenes such as alpha-methyl styrene, alpha-ethyl styrene, alpha-butyl styrene, alpha-chlorostyrene, alpha-bromostyrene, 2,5-dichlorostyrene, 2,5-dibromostyrene, ortho-, meta-, and para-methoxystyrene, para-alpha-dimethyl styrene, paramethyl styrene, 3,4-dichlorostyrene, 3,4-difluorostyrene, 2,4-dichlorostyrene, 2,4,5-trichlorostyrene, dichloro-monofluorostyrenes and the like. Copolymerization of vinylidene cyanide with styrene and substituted styrenes is disclosed in U.S. Patent 2,615,868, issued October 28, 1952;

(4) Olefins of the general structure

wherein R is an alkyl radical, preferably containing from 1 to 6 carbon atoms, such as isobutylene, (2-methyl proprene-1), 2-methyl-butene-1, 2-methylpentene-1, 2,3-dimethylbutene-1, 2,3-dimethyl-pentene-1, 2,3,3-trimethylbutene-1, 2,3,4-trimethylpenetene-1, 2,6-dimethyloctene-1, 2-methylnonadecene-1, and the like. Copolymerization of such olefins with vinylidene cyanide is disclosed in U.S. Patent 2,615,865, issued October 28, 1952;

(5) Alkyl esters of methacrylic acid which possess the structure

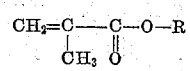

wherein R is an alkyl radical, preferably containing from 1 to 8 carbon atoms, for example, methyl methacrylate, ethyl methacrylate, propyl methacrylate, butyl methacrylate, amyl methacrylate, hexyl methacrylate, heptyl methacrylate, octyl methacrylate, decyl methacrylate, and the like. Vinylidene cyanide/alkyl methacrylate copolymers and their preparation are disclosed in U.S. Patent 2,615,871, issued October 28, 1952;

(6) 2-halogenated monoolefins of the structure

wherein R is a lower alkyl radical such as methyl, ethyl, propyl or butyl, and Y is a halogen atom, such as 2-chloropene, 2-chlorobutene, 2-chloropentene, 2-chlorohexene, 2-chloroheptene, 2-bromobutene, 2-bromoheptene, 2-fluorohexene, 2-fluorobutene, 2-iodopropene, 2-iodopentene, and the like. Copolymerization of these compounds with vinylidene cyanide is disclosed in U.S. Patent 2,615,877, issued October 28, 1952;

(7) Isopropenyl esters of organic monocarboxylic acids, preferably of the formula RCOOH, wherein R is an alkyl radical containing from 1 to 6 carbon atoms, and including isopropenyl acetate, isopropenyl propionate, isopropenyl isobutyrate, isopropenyl valerate, isopropenyl caproate, and isopropenyl enanthate; as well as isopropenyl esters of aromatic carboxylic acids, for example, isopropenyl benzoate, isopropenyl p-chlorobenzoate, isopropenyl o-chlorobenzoate, isopropenyl m-chlorobenzoate, isopropenyl toluate, isopropentyl alpha-chloroacetate, isopropenyl alpha-bromo propionate, and the like; the copolymerization of all of which with vinylidene cyanide is described in U.S. Patent 2,615,875, issued October 28, 1952;

(8) Vinyl esters of alpha-halo saturated aliphatic monocarboxylic acids of the structure

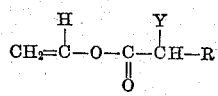

wherein R is a member of the class consisting of hydrogen and an alkyl radical, preferably a lower alkyl radical, and Y is a halogen atom, such as vinyl alpha-chloroacetate, vinyl alpha-bromoacetate, vinyl alpha-chloropropionate, vinyl alpha-bromopropionate, vinyl alpha-iodopropionate, vinyl alpha-bromovalerate and the like. The copolymerization of such monomers with vinylidene cyanide is described in U.S. Patent 2,615,876, issued October 28, 1952.

(9) Vinyl halides such as vinyl chloride, vinyl bromide and the like, which are copolymerized with vinylidene cyanide as described in U.S. Patent 2,615,869, issued October 29, 1952.

In addition to interpolymers of vinylidene cyanide containing the essentially 1 to 1 molar alternating structure and essentially 50 mol percent vinylidene cyanide units, such as those disclosed in the patents referred to above, other vinylidene cyanide interpolymers have been described. For example, there are included interpolymers, of this vinylidene cyanide content, made from vinylidene cyanide and more than one copolymerizable monoolefinic compound, at least one of which forms an essentially 1:1 alternating copolymer when copolymerized with vinylidene cyanide, a large number of which interpolymers are disclosed in U.S. Patent 2,716,106.

Among the polymerizable monoolefinic compounds which form interpolymers with vinylidene cyanide are included, by way of example, the following classes of compounds:

Monoolefinic hydrocarbons, that is, monomers containing only atoms of hydrogen and carbon such as styrene; alpha-methyl styrene; alpha-ethyl styrene; isobutylene (2-methylpropene-1); 2-methyl-butene-1; 2-methyl-heptene-1; 2,3-dimethyl-hexene-1; 2,3,4-trimethyl-pentene-1; ethylene; propylene; butylene; amylene; hexylene and the like.

Halogenated monoolefinic hydrocarbons, that is, monomers containing carbon, hydrogen and one or more halogen atoms, such as alpha-chlorostyrene; alpha-bromostyrene; 2,5-dichlorostyrene; 3,4-dichlorostyrene; 2,6-dichlorostyrene; dichloromonofluorostyrenes; 2-chloropropene; 2-chlorohexene; 4-fluoroheptene; 1,2-dibromoethylene; 1,2-diiodoethylene and the like;

Vinyl esters of inorganic acids such as vinyl chloride, bromoethylene, iodoethylene, and fluoroethylene;

Monoolefinically unsaturated esters such as vinyl acetate, vinyl propionate, vinyl butyrate, vinyl valerate, vinyl caproate, vinyl o-chlorobenzoate, vinyl m-chlorobenzoate and similar vinyl halobenzoates, vinyl p-methoxybenzoate, methyl methacrylate, propyl methacrylate, amyl methacrylate, octyl methacrylate and ethyl tiglate, methyl acrylate, ethyl acrylate, propyl acrylate, isopropyl acrylate, amyl acrylate, 3,5,5-trimethylhexylacrylate and dodecylacrylate;

Isopropenyl acetate, isopropenyl propionate, isopropenyl valerate, isopropenyl-p-chlorobenzoate, isopropenyl o-bromobenzoate, and isopropenyl alpha-bromopropionate;

Vinyl alpha-chloroacetate, vinyl alpha-bromoacetate, vinyl alpha-chloropropionate and vinyl alpha-chlorobutyrate, vinyl alpha-bromovalerate;

Allyl chloride, allyl cyanide, allyl bromide, allyl fluoride, allyl iodide, allyl nitrate, allyl thiocyanate, allyl butyrate, allyl benzoate, allyl 2,5,5-trimethyl hexoate, allyl lactate, allyl pyruvate, allyl acetoacetate, allyl thioacetate as well as methallyl esters corresponding to the above allyl esters as well as esters from such alkenyl alcohols as beta-ethyl allyl alcohol, beta-propyl allyl alcohol, and 1-buten-4-ol;

Methyl alpha-chloroacrylate, methyl alpha-bromoacrylate, ethyl alpha-chloroacrylate, propyl alpha-chloroacrylate, amyl alpha-chloroacrylate, 3,5,5-trimethyl hexyl alpha-chloroacrylate and decyl alpha-cyano acrylate;

Dimethyl maleate, diethyl maleate, dimethyl fumarate, diethyl fumarate and diethyl gluconate;

Monoolefinically unsaturated organic nitriles such as acrylonitrile, methacrylonitrile, 1,1-dicyanopropene-1, crotononitrile, oleonitrile and the like;

Monoolefinically unsaturated carboxylic acids such as acrylic acid, methacrylic acid, crotonic acid, 3-butenoic acid, angelic acid, tiglic acid and the like.

Of these vinylidene cyanide copolymers a particularly useful copolymer which can readily be converted to filaments of excellent physical properties is the copolymer of vinylidene cyanide and vinyl acetate preferably consisting essentially of a regular structure of alternated units of the monomers, i.e., approximately 50 mol percent of each.

These copolymers are somewhat difficult to dye.

It is accordingly an object of the invention to render those copolymers dyeable with cationic dyes and with disperse dyes.

In accordance with one aspect of the present invention the monomers making up the vinylidene cyanide copolymer are copolymerized along with sufficient amount of the ethylenically unsaturated organic sulfonic acid to produce a copolymer containing about 0.15 to 2 mol percent of the sulfonic acid component. Lower proportions of the sulfonic acid do not effect a sufficiently pronounced improvement in dyeability while higher amounts than those indicated result in a material which is sensitive to hot water. Advantageously the proportion of the sulfonic acid component in the copolymer is less than about 1 mol percent since this is less water sensitive and can be wet spun into shaped structures such as filaments in the same manner and with the same system as copolymers identical except for the absence of the sulfonic acid component. Preferably the proportion of the sulfonic acid component in the copolymer is less than about 0.35 mol percent since this range of products is even less water sensitive, is less expensive and produces an adequate dyeability improvement without impairment of any of the other properties of fibers produced from copolymers lacking the sulfonic acid unit.

Representative sulfonic acids which may be employed include styrene sulfonic acids such as ortho-, meta- or para-styrene sulfonic acid as well as commercial mixtures thereof, ortho-, meta- or para-sulfomethyl styrene, mixtures thereof, and substitution products thereof such as poly-sulfo derivatives as well as β-sulfoethyl methacrylate (isethionic acid ester of methacrylic acid), and the like. While operative, sulfonic acids wherein the sulfo group is less than three atoms removed from the ethylenic unsaturation do not produce equally good results, e.g., vinylsulfonic acid, allylsulfonic acid, methallyl sulfonic acid and the like.

While the balance of the units making up the copolymer may be any of those disclosed in the above-identified patents, advantageously the balance of the units comprises about 45 to 55 mol percent of vinylidene cyanide and about 45 to 55 mol percent of a monoolefin, especially an unsaturated ester and particularly an unsubstituted ester containing fewer than about seven carbon atoms, e.g., methyl methacrylate and particularly vinyl acetate. Preferably vinylidene cyanide and vinyl acetate are present in approximately equimolar proportions, although the vinylidene cyanide may be present in lesser amount, e.g., 30 mol percent.

In preparing a vinylidene cyanide-vinyl acetate copolymer by commercial technique the monomer units are alternated in the chain and the product is substantially colorless. If the sulfonic acid in its commercial form is incorporated into the monomer mix in the desired proportion, unfortunately the product is highly colored and for the most part comprises a homopolymer of vinylidene cyanide.

In accordance with another aspect of the invention special procedures are provided for producing the novel copolymers having desirable properties. Specifically, the sulfonic acid must be substantially anhydrous and substantially free of alkaline reacting salt. Styrene sulfonic acid is sold commercially in the form of an alkali metal salt which is alkaline. Not only is this salt unsuitable for polymerization but even an acetic acid solution thereof is inadequate, i.e., the acetic acid solvents forms sodium acetate but this too is alkaline reacting. To make the commercial sodium styrene sulfonate suitable for use in accordance with the invention it must be substantially freed of alkaline reacting salt. This can be effected by removal of the sodium ion as by dialysis or by ion exchange on the hydrogen cycle. Alternatively, they may be added to the commercial sulfonate a strong acid such as oleum, hydrogen sulphate (anhydrous sulfuric acid), hydrogen chloride and the like, the acid being added to the sulfonate in at least stoichiometric proportion based on the proportion of sulfonate present as salt.

The strong acid such as hydrogen chloride, for example, will preferentially react with the sodium ions to liberate free sulfonic acid and to produce sodium chloride. Any precipitated sodium chloride may be filtered off; since sodium chloride is not alkaline reacting any sodium chloride still in solution may be left dissolved and the solution used as such or the sulfonic acid may be isolated from the solution in relatively pure state by extraction and distillation.

The polymerization itself may be carried out in several different ways. One preferred method consists in first dissolving the vinylidene cyanide and other monomers in benzene or other aromatic solvent such as toluene, methyl toluene, trichlorobenzene, or the like, preferably free from impurities which initiate the ionic polymerization of the monomer, and in an amount such that the solvent comprises approximately 30 to 80% by weight of the total solution. A polymerization catalyst is included in this solution and the resulting mixture is heated to a temperature of about 30° C. to 80° C. whereupon polymerization occurs to form the desired copolymer as a white powder of small particle size. The copolymer thus formed may be separated from the polymerization medium simply by filtering, or if desired the polymerization medium may be removed by evaporation.

A second method of polymerization consists in agitating the monomers in a liquid aliphatic hydrocarbon (which is a non-solvent for vinylidene cyanide), for example, hexane or heptane, in the presence of the polymerization catalyst, whereupon the copolymer forms and may be separated from the polymerization medium by filtering or by evaporating the medium. It is important when using this method of polymerization that the liquid aliphatic hydrocarbon be free from impurities which initiate the ionic polymerization of vinylidene cyanide.

Alternatively, the polymerization may be carried out without the use of a solvent or other liquid medium for the monomers, that is, simply by heating and agitating a mixture of the monomers and polymerization catalyst. Also, the polymerization may be effected at temperatures as low as 0° C. or lower or as high as 100° C. or even higher provided a catalyst is utilized which will dissociate into free radicals at the polymerization temperature.

It is often desirable to add, continuously or intermittently, fresh quantities of the monomers, and also of catalyst and solvent, if desired, to the polymerization mixture during the course of the polymerization, thus taking fullest advantage of the capacity of the equipment and in effect operating a continuous or semi-continuous process.

The catalyst which is used in the polymerization is preferably a peroxygen compound such as silver peroxide, the perborates, the percarbonates, benzoyl peroxide, caproyl peroxide, lauroyl peroxide, acetone peroxide, acetyl benzoyl peroxide, cumene hydroperoxide, o,o'-dichlorobenzoyl peroxide, o,o'-dibromobenzoyl peroxide, caprylyl peroxide, pelargonyl peroxide, tertiary butyl hydroperoxide, and the like. In general, from 0.01 to 1% by weight of the catalyst is utilized, although smaller or larger amounts may be utilized if desired. By regulating the amount of the catalyst it is possible to control very accurately the molecular weight of the copolymer. For instance, to obtain a high molecular weight copolymer, a small quantity of catalyst is used, while low molecular weight copolymers are obtained by the use of large amounts of catalyst.

The molecular weight of the preferred copolymers produced in accordance with the invention usually exceeds about 10,000, advantageously exceeds about 20,000 and preferably ranges from about 25,000 to 1,000,000. The inherent viscosity of the copolymer is at least about 0.5, advantageously about 1 to 3 and preferably about 1.5 to 2.5 as determined in γ-butyrolactone at 25° C.

The preferred copolymer consists predominantly of alternating units of vinylidene cyanide and vinyl acetate with the units of sulfonic acid distributed in the polymer chain. In defining the composition of such a copolymer the number of sulfonic acid and vinyl acetate units may be defined as a percent of the total or alternately as a percent of the vinylidene cyanide units. Thus where the vinylidene cyanide and vinyl acetate units are present in approximately equal numbers the percentage of sulfonic acid units based on vinylidene cyanide units will be approximately double the value based on the total number of units in the copolymer.

The copolymer can be converted into shaped structures such as castings or sheet material. It is especially suited for conversion into filamentary material in any conventional manner as by wet, dry or melt spinning. Techniques especially suited for a copolymer containing up to about 1 mol percent of sulfonic acid units involve wet spinning of a solution of the copolymer in dimethylformamide into an aqueous coagulant in accordance with U.S. Patent 2,615,866, by wet spinning a solution of the polymer in concentrated acetonitrile into an aqueous coagulant in accordance with U.S. Patent 2,862,903, or the like. If desired, pigments, delustrants and/or dye-ability-improving additives may be present in the solution being spun.

In accordance with another aspect of the invention it has been found that the copolymer can be rendered readily dyeable with disperse dyes as well as with cationic dyes, if there is incorporated into the copolymer as an additive a polymer of an N-substituted-acrylamide, e.g., an N-alkyl-acrylamide and particularly N,N-dimethyl-acrylamide. This aspect of the invention will be further described with reference to the N,N-dimethyl-acrylamide.

The N,N-dimethyl-acrylamide may be added as a homopolymer or as a copolymer containing at least about 40% and preferably at least about 50% by weight of N,N-dimethyl-acrylamide. The other monomer of the copolymer may be any monoolefinic monomer such as vinyl acetate, acrylonitrile, styrene, methyl acrylate, methyl methacrylate or any of the other monomers referred to hereinabove as copolymerizable with vinylidene cyanide. The N,N-dimethyl-acrylamide homopolymer or copolymer may be prepared in solution systems by charging monomers and a free radical catalyst such as benzoyl peroxide to a polymerization bottle or flask containing hexane, heptane, or a similar solvent and equipped for temperature control, agitation and condensation of reaction vapors. Several hours heating and stirring at 50°–70° C. produces a slightly gummy to granular polymer or copolymer that can be filtered, washed and vacuum dried at 40–50° C. Another method that may be employed to prepare homopolymers and copolymers of N,N-dimethyl-acrylamide is emulsion polymerization. Demineralized water is used as the reaction medium, sodium bicarbonate as a buffer, Aerosol OT (dioctyl ester of sodium sulphosuccinic acid) as the emulsifier, and ammonium persulfate as the catalyst. The reaction vessel is purged with nitrogen, the monomers are charged, and the polymerization is run at 90° C. for about 6 hours. Fine particle size polymer is filtered, dried in a vacuum dryer at 50° C. washed with hexane, redried in the vacuum dryer, and is ready for addition to the vinylidene cyanide polymer. The inherent viscosity of the N,N-dimethyl-acrylamide polymer may vary within wide limits, e.g., from about 0.5 or less to about 3 or more and preferably from about 1 to 2 as measured in γ-butyrolactone at 25° C.

The N,N-dimethyl-acrylamide polymer is added to a melt or solution of the vinylidene cyanide copolymer in an amount such that there are at least about 4% of N,N- dimethyl-acrylamide based on the combined weight of vinylidene cyanide copolymer and N,N-dimethyl-acrylamide polymer. On the other hand, fiber properties suffer if the N,N-dimethyl-acrylamide copolymer or homopolymer is present in more than about 15% of the combined weight of vinylidene cyanide copolymer and N,N-dimethyl-acrylamide polymer.

Apparently only the N,N-dimethyl-acrylamide moiety of a copolymer thereof is effective in improving dyeability and only this should be considered in computing the amount to be added for a particular desired effect. Thus, for example, 10 parts of a 50/50 N,N-dimethyl-acrylamide/vinyl acetate copolymer contain 5 parts of N,N-dimethyl-acrylamide as do 6.7 parts of a 75/25 N,N-dimethyl-acrylamide/vinyl acetate copolymer.

The ratio of N,N-dimethyl-acrylamide to vinylidene cyanide copolymer may be varied in two ways. If a single homopolymer or copolymer of N,N-dimethyl-acrylamide is being used, the parts by weight of that material may be increased or decreased. Another way to vary the amount of N,N-dimethyl-acrylamide is to use mixtures of copolymers thereof containing different amounts of N,N-dimethyl-acrylamide by weight, but it is not desirable to use copolymers containing less than about 40 percent by weight of N,N-dimethyl-acrylamide for these materials form solutions only with difficulty and the fibers produced therefrom are more difficult to dye.

The novel products may be dyed while still in unshaped form or they may first be shaped and subsequently dyed, as is more conventional with synthetic fibers.

The invention will be further described in the following illustrative examples.

Example I

A solution is made up of 47.5 parts of vinylidene cyanide, 42.5 parts of acetic acid, 360 parts of vinyl acetate, 0.4 part of O,O'-dichlorobenzoylperoxide as catalyst and 1.5 parts of 15% fuming sulfuric acid. To this there is added a solution in 120 parts of glacial acetic acid of 0.85 part of commercial potassium styrene sulfonate comprising 40% ortho and 60% para. The excess vinyl acetate guarantees against production of any colored runs of polyvinylidene cyanide in the polymer chain. Polymerization is carried out at 70° C. for 30 minutes, the product is cooled to room temperature, filtered, washed with vinyl acetate and dried at 60° C. It comprises about 0.3 mol percent of styrene sulfonic acid units, about 49.85 mol percent of vinylidene cyanide units and about 49.85 mol percent of vinyl acetate units. The vinylidene cyanide units are not present in long stretches, as evidenced by the absence of the red color characteristic thereof. The terpolymer flake dyes heavily with Sevron Blue B (Basic Blue, Colour Index Number 21), a cationic dye, whereas copolymer free of styrene sulfonic acid units is barely stained. The terpolymer can be wet spun into 3 denier filaments from dimethylformamide solution according to U.S. Patent 2,615,866.

If the oleum is omitted from the initial solution a red homopolymer of vinylidene cyanide forms immediately upon addition of the potassium styrene sulfonate.

Example II

The process of Example I is repeated with the exception that the fuming sulfuric acid is first added to the solution of potassium styrene sulfonate rather than directly to the solution of vinylidene cyanide. Substantially the same results are achieved.

Example III

The same results are obtained if the fuming sulfuric acid of Example II is replaced by hydrogen chloride present in stoichiometric proportion relative to the potassium of the potassium styrene sulfonate.

Example IV

Commercial sodium styrene sulfonate in glacial acetic acid is passed through a column containing a sulfonated styrene-divinyl benzene copolymer cation exchange resin, the resin being pre-washed with glacial acetic acid. The resulting solution of styrene sulfonic acid in glacial acetic acid is adjusted to a 3.7% concentration and is added to a mxture of vinylidene cyanide, acetic acid, vinyl acetate, and catalyst to give the same molar proportions as in Example I, the addition of fuming sulfuric acid being unnecessary. Polymerization proceeds as in Example I to give substantially the same results.

Example V 10 parts of N,N-dimethyl-acrylamide, 8.6 parts of vinyl acetate and 0.06 part of 2,4-dichloro-benzoyl peroxide are added to 100 parts of n-hexane. The mass is held at 60° C. for a day. The resulting solid product comprises 70% N,N-dimethyl-acrylamide as determined by nitrogen analysis. Its inherent viscosity at 25° C. in γ-butyrolactone is 1.6. 1.6 parts of the copolymer are dissolved in 80 parts of acetonitrile along with 18.4 parts of the vinylidene cyanide terpolymer of Example I and the solution is spun into 3 denier filaments according to U.S. Patent 2,862,903. The tenacity and elongation of the filaments are substantially the same as in Example I. The filaments can be heat set more easily than unmodified filaments, thereby permitting use of less severe setting conditions. Heat setting the filaments eliminates the voids in the filaments, thereby rendering them lustrous and transparent provided no delustrant is present. The filaments dye readily in conventional manner with cationic and/or disperse dyes, e.g., Basic Yellow 11 (Second Edition, Colour Index No. 48055) or Celliton Fast Pink BA (1-amino-4-hydroxy-anthraquinone), giving deep shades and high exhaustion. Also the filaments stain far less with acid dyes than do filaments lacking the styrene sulfonic acid and N,N-dimethyl-acrylamide, making them better suited for cross-dyeing with wool. The dyeings are fast to washing, dry cleaning and light, being resistant to gas fading and o-fading. The dyeability is unimpaired even if the filaments are first heat set; by contrast if filaments, differing only in the absence of styrene sulfonic acid units, are first heat set they are no longer readily dyeable.

Example VI

In place of the N,N-dimethyl-acrylamide copolymer of Example V there can be used 2 parts of a copolymer comprising 40/60 N,N-dimethyl-acrylamide/methyl methacrylate, prepared in the same manner.

Example VII

In place of the N,N-dimethyl-acrylamide copolymer of Example V there can be used 1.1 parts of N,N-dimethyl-acrylamide homopolymer.

It is to be understood that the foregoing detailed description is given merely by way of illustration and that many variations may be made therein without departing from the spirit of our invention.

Having described our invention what we desire to secure by Letters Patent is:

1. A composition of matter comprising (A) a copolymer of vinylidene cyanide, an ethylenically unsaturated organic sulfonic acid and at least one other ethylenically unsaturated monomer, the sulfonic acid units constituting about 0.15 to 2 percent of the total number of monomer units making up the copolymer, and (B) a polymer selected from the group consisting of homopolymers of N,N-dimethylacrylamide and copolymers of N,N-dimethylacrylamide with an ethylenically unsaturated comonomer, said polymer being present in up to about 15% of the weight of (A) plus (B).

2. A composition of matter according to claim 1 wherein the N,N-dimethylacrylamide content of (B) is at least about 40% by weight and the N,N-dimethylacrylamide content of (A) plus (B) is at least about 4% by weight.

3. A composition of matter according to claim 1 wherein (B) is a copolymer containing at least about 50% by weight of the N,N-dimethylacrylamide.

4. A composition of matter according to claim 3 wherein (B) is a copolymer of the N,N-dimethylacrylamide with vinyl acetate.

5. A composition of matter comprising (A) a copolymer of vinylidene cyanide, an ethylenically unsaturated organic sulfonic acid wherein the sulfo group is separated from the ethylenic unsaturation by at least three atoms and another ethylenically unsaturated monomer, the sulfonic acid units constituting about 0.15 to 2 percent of the total number of monomer units making up the copolymer, and (B) a polymer selected from the group consisting of homopolymers of N,N-dimethylacrylamide and copolymers of N,N-dimethylacrylamide with an ethylenically unsaturated comonomer, said polymer being present in up to about 15% of the weight of (A) plus (B), the N,N-dimethyl-acrylamide content of (B) being at least about 50% by weight and the N,N-dimethyl-acrylamide content of (A) plus (B) being at least about 4% by weight.

6. A composition of matter comprising (A) a copolymer of vinylidene cyanide, a styrene sulfonic acid and vinyl acetate units the vinylidene cyanide and vinyl acetate units each constituting about 45 to 55 percent and the styrene sulfonic acid units constituting about 0.15 to 1 percent of the total number of monomer units making up the copolymer, and (B) a polymer selected from the group consisting of homopolymers of N,N-dimethylacrylamide and copolymers of N,N-dimethylacrylamide with an ethylenically unsaturated comonomer, said polymer being present in up to about 15% of the weight of (A) plus (B), the N,N-dimethyl-acrylamide content of (B) being at least about 40% by weight and the N,N-dimethyl-acrylamide content of (A) plus (B) being at least about 4% by weight.

7. A composition of matter comprising (A) a copolymer consisting essentially of alternate units of vinylidene cyanide and vinyl acetate and having about 0.15 to 0.35 unit of a styrene sulfonic acid per 100 monomer units making up the copolymer, and (B) a polymer selected from the group consisting of homopolymers of N,N-dimethylacrylamide and copolymers of N,N-dimethylacrylamide with an ethylenically unsaturated comonomer, said polymer being present in up to about 15% of the weight of (A) plus (B), the N,N-dimethyl-acrylamide content of (B) being at least about 50% by weight and the N,N-dimethyl-acrylamide content of (A) plus (B) being at least about 4% by weight.

8. Filamentary material comprising (A) a copolymer of vinylidene cyanide, an ethylenically unsaturated organic sulfonic acid wherein the sulfo group is separated from the ethylenic unsaturation by at least three atoms and another ethylenically unsaturated monomer, the sulfonic acid units constituting about 0.15 to 2 percent of the total number of monomer units making up the copolymer, and (B) a polymer selected from the group consisting of homopolymers of N,N-dimethylacrylamide and copolymers of N,N-dimethylacrylamide with an ethylenically unsaturated comonomer, said polymer being present in up to about 15% of the weight of (A) plus (B).

9. Filamentary material according to claim 8 wherein the N,N-dimethylacrylamide content of (B) is at least about 40% by weight and the N,N-dimethylacrylamide content of (A) plus (B) is at least about 4% by weight.

10. Filamentary material comprising (A) a copolymer of vinylidene cyanide, an ethylenically unsaturated organic sulfonic acid wherein the sulfo group is separated from the ethylenic unsaturation by at least three atoms and another ethylenically unsaturated monomer, the sulfonic acid units constituting about 0.15 to 2 percent of the total number of monomer units making up the copolymer, and (B) a polymer selected from the group consisting of homopolymers of N,N-dimethylacrylamide and copolymers of N,N-dimethylacrylamide with an ethylenically unsaturated comonomer, said polymer being present in up to about 15% of the weight of (A) plus (B), the N,N-dimethyl-acrylamide content of (B) being at least about 50% by weight and the N,N-dimethyl-acrylamide content of (A) plus (B) being at least about 4% by weight.

11. Filamentary material comprising (A) a copolymer of vinylidene cyanide, a styrene sulfonic acid and vinyl acetate, the vinylidene cyanide and vinyl acetate units each constituting about 45 to 55 percent and the styrene sulfonic units constituting about 0.15 to 1 percent of the total number of monomer units making up the copolymer, and (B) a polymer selected from the group consisting of homopolymers of N,N-dimethylacrylamide and copolymers of N,N-dimethylacrylamide with an ethylenically unsaturated comonomer, said polymer being present in up to about 15% of the weight of (A) plus (B), the N,N-dimethylacrylamide content of (B) being at least about 40% by weight and the N,N-dimethylacrylamide content of (A) plus (B) being at least about 4% by weight.

12. Filamentary material comprising (A) a copolymer consisting essentially of alternate units of vinylidene cyanide and vinyl acetate and having about 0.15 to 0.35 unit of a styrene sulfonic acid per 100 monomer units making up the copolymer, and (B) a polymer selected from the group consisting of homopolymers of N,N-dimethylacrylamide and copolymers of N,N-dimethylacrylamide with an ethylenically unsaturated comonomer, said polymer being present in up to about 15% of the weight of (A) plus (B), the N,N-dimethylacrylamide content of (B) being at least about 50% by weight and the N,N-dimethylacrylamide content of (A) plus (B) being at least about 4% by weight.

References Cited by the Examiner

UNITED STATES PATENTS

| | | | |
|---|---|---|---|
| 2,615,877 | 10/52 | Folt | 260—78.5 |
| 2,620,324 | 12/52 | Coover et al. | 260—883 |
| 2,773,856 | 12/56 | Meyer et al. | 260—79.3 |
| 2,832,746 | 4/58 | Jackson | 260—900 |
| 2,837,501 | 6/58 | Millheiser | 260—79.3 |
| 2,842,525 | 7/58 | Gateff et al. | 260—879 |
| 2,974,119 | 3/61 | Schuller et al. | 260—898 |
| 2,975,158 | 3/61 | Sayre | 260—78.5 |
| 3,008,918 | 11/61 | Stanton et al. | 260—881 |

LEON J. BERCOVITZ, *Primary Examiner.*

WILLIAM H. SHORT, DONALD E. CZAJA,
*Examiners.*